March 29, 1955     A. C. HOWELL, JR     2,705,094
METERING VALVE
Filed March 20, 1950
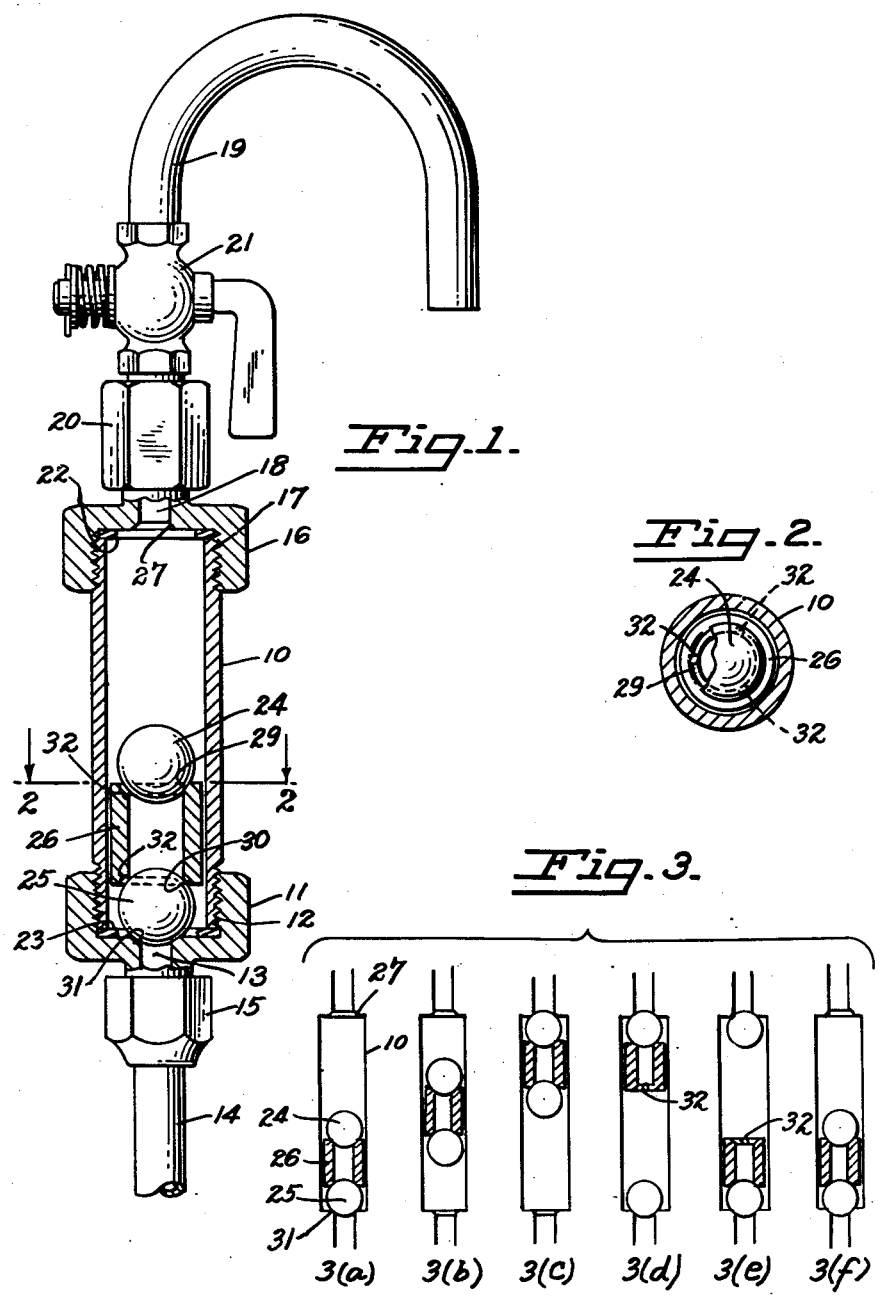
INVENTOR.
ALLEYNE C. HOWELL, JR.
BY
Townsend and Townsend
ATTORNEYS

United States Patent Office

2,705,094
Patented Mar. 29, 1955

2,705,094

METERING VALVE

Alleyne C. Howell, Jr., San Francisco, Calif.

Application March 20, 1950, Serial No. 150,659

6 Claims. (Cl. 222—335)

This invention relates to a metering valve operable by the flow of fluid passing through the valve to automatically deliver a predetermined quantity of fluid for each cycle of operation.

It is an object of this invention to provide a simple and efficient metering valve having a small number of simple working parts whereby construction and maintenance costs are kept to the minimum.

It is a further object of this invention to provide a metering valve in which the moving parts are adapted to return to normal position between successive deliveries of fluid in a much shorter period of time than is possible with such devices now commercially available.

Various other objects and advantages of the improved metering valve in part will be obvious from an inspection of the accompanying drawings and in part will be more fully set forth in the following particular description of one form of the improved metering valve and the invention also consists in certain new and novel features of constructions and combination of parts hereinafter set forth and claimed.

Referring to the accompanying drawings:

Fig. 1 is a side elevation of one embodiment of this invention showing the central section broken away for purposes of clarity;

Fig. 2 is a cross-sectional view of the structure illustrated in Fig. 1 and is taken on the line 2—2 of Fig. 1; and Fig. 3, views a, b, c, d, e and f, is a diagrammatic representation of the structure illustrated in Fig. 1 showing the location of the various valve parts during the several sequential steps of an operating cycle of the valve.

The valve illustrated in the drawings comprises a cylindrical housing 10. The housing 10 is arranged with its vertical axis substantially vertical. Its lower end is provided with a cap 11, suitably secured to the housing, as by means of mating screw threads 12. The cap 11 is provided with an axial bore 13 which forms an inlet passage into the lower portion of the valve. The cap is secured to a supply pipe 14, as by means of a union 15.

The upper end of the housing 10 is provided with a cap 16, suitably secured to the housing 10, as by means of mating screw threads 17. The upper cap 16 is provided with an axial bore 18 which forms an outlet passage leading from the metering valve. The upper cap 16 is secured to an outlet pipe 19, as by means of a union 20, and the outlet pipe 19 is provided with an operating valve 21 which serves to close and open the outlet pipe 19.

The lower cap 11 and the upper cap 16 are provided with compressible washers 22, 23 so as to maintain leakproof joints between the upper and lower caps and the cylindrical housing.

The operating mechanism for the metering valve is located in the interior of the cylindrical housing 10 and it includes three moving parts. The uppermost moving part is a sphere 24 and the lowermost moving part is a sphere 25. Intermediate the spheres 24, 25 there is movably mounted a sleeve 26. A valve face 27 is shaped in the lower surface of the upper cap 16 and is configured so as to mate with the upper sphere 24. A valve face 29 is formed in the upper surface of the sleeve 26 and is configured to mate with the upper sphere 24. A valve face 30 is formed in the lower surface of the sleeve 26 and is configured to mate with the lower sphere 25. A valve face 31 is formed in the upper surface of the lower cap 11 and is configured to mate with the lower sphere 25. Each of the valve faces 29 and 30 is provided with a plurality of notches 32 (see Fig. 2), whereby infinitesimal leaking zones are established in each face.

Each of the spheres 24, 25 is so proportioned that its diameter is considerably less than the diameter of the interior bore of the cylindrical housing 10. I have found that satisfactory proportions are obtained by making the cross-sectional area of the spheres 24, 25 slightly more than one-half of the cross-sectional area of the interior bore of the cylindrical housing 10. The outer diameter of the sleeve 26 is so proportioned with respect to the interior of the cylindrical housing 10 that there is an easy sliding fit between the sleeve 26 and the cylindrical housing 10. The interior bore of the sleeve 26 is smaller than the diameter of the spheres 24, 25 but is sufficiently large to permit a relatively easy flow of fluid through the interior of the sleeve.

The operation of the foregoing metering valve is both simple and rapid. The fluid to be metered is supplied under pressure to the metering valve through the supply pipe 14. When the operating valve 21 is closed the pressure conditions within the metering valve are static and the force of gravity maintains the moving valve parts 24, 25 and 26 in their normal position at the bottom of the cylindrical housing 10 (Fig. 3a). In order to obtain a metered quantity of fluid, the operating valve 21 is opened. The movement of fluid through the supply pipe 14 into the interior of the metering valve carries the moving parts of the valve upwardly (Fig. 3b) until the upper sphere 24 seats against the valve face 28 (Fig. 3c). This movement of fluid through the metering valve displaces upwardly a predetermined quantity of fluid located above the moving valve parts 24, 25 and 26. The pressure conditions within the interior of the cylindrical housing 10 become again static and the infinitesimal leak past the plurality of notches 32 in the valve seat 30 permits the lower sphere 25 to drop downwardly under the force of gravity (Fig. 3d). Almost simultaneously the infiintesimal leaks through the plurality of notches 32 in the valve seat 29 permit the sleeve 26 to drop downwardly into normal operation (Fig. 3e). The valve 21 may now be closed and the pressure conditions between the interior of the cylindrical housing 10 and the axial bore 18 will become static and the sphere 24 is drawn downwardly through the force of gravity to the normal position (Fig. 3f).

The loose-fitting parts of the above described metering valve make the valve particularly useful for such viscous fluids as flavor syrups used in beverage dispensing devices. The small cross sectional area of the moving parts and the large area of the fluid passage permits the valve parts to drop rapidly under the force exerted by gravity so that the metering valve is made ready for a repeat cycle much more rapidly than is usual in beverage dispensers.

The foregoing statements regarding the functioning of the above described metering valve have been substantiated by actual work in the field. Metering valves constructed in accordance with the teachings of the foregoing description have been subjected to severe actual working conditions and have materially speeded up the accurate delivery of fluid.

The above described metering valve is susceptible to many practical applications. The caps 11 and 16 may be integrally secured to the house 10 as by welding so as to provide a sealed unit. By providing a sealed unit, the user of the valve will be unable to tamper with the valve so as to change the quantity of fluid measured by the valve and the purchaser of cola flavored drinks, for example, will be assured of receiving a full measure of syrup in each drink.

Another practical advantage of the specific embodiment illustrated is that the metering valve will function equally well if vertically reversed. This mode of operation is made possible through the provision of the valve face 31 in the upper surface of the lower cap 11. Obviously if the valve is to be used in the illustrated position only, the valve face 31 may be omitted since in that event the bottom valve face has no operative function.

Also, it is apparent that the volume of fluid metered by the valve is directly dependent upon the displacement of the moviing valve parts in their travel from the inlet end to the outlet end of the valve. Therefore, the amount of fluid metered may be changed by shortening or lengthening the stroke of the moving parts, for example, by shortening or lengthening the housing 10 or by providing suitable stop means to prevent the sphere 25, the sleeve 26, and the sphere 24 from moving all of the way toward the inlet end of the valve.

Obviously numerous changes and modifications may be made in certain of the structural features described above without departing from the spirit and scope of the invention, the invention being limited only by the scope of the appended claims.

Having thus described a specific embodiment of the invention, what I claim as new and desire to secure by Letters Patent are:

1. A metering valve including a cylindrical housing having its axis arranged substantially vertically, a three-piece valve within said cylindrical housing comprising two spheres and one sleeve having two end surfaces, a first valve face formed in one end surface of said sleeve and configured to mate with one of said spheres and a second valve face formed in the other end surface of said sleeve and configured to mate with the other sphere, the sleeve being interposed between the two spheres, the cross-sectional area of each sphere being substantially less than the cross-sectional area of the inner diameter of the cylindrical housing whereby a fluid passage of considerable cross-sectional area is provided between each sphere and the inner wall of the cylindrical housing, the outer diameter of the sleeve being slightly less than the inner diameter of the cylindrical housing and the inner bore of the sleeve being of considerable cross-sectional area whereby a fluid passage is provided within the interior of the sleeve, an inlet port at the bottom of said cylindrical housing being arranged to be connected to a source of fluid under pressure, and an outlet port at the top of said cylindrical housing being arranged to be connected to an outlet pipe provided with an open-shut operating valve.

2. A metering valve including a cylindrical housing having its axis arranged substantially vertically, a three-piece valve within said cylindrical housing comprising two spheres and one sleeve having two end surfaces, a first valve face formed in one end surface of said sleeve and configured to mate with one of said spheres and a second valve face formed in the other end surface of said sleeve and configured to mate with the other sphere, the sleeve being interposed between the two spheres, the cross-sectional area of the spheres being slightly over one-half of the cross-sectional area of the inner diameter of the cylindrical housing whereby a fluid passage of considerable cross-sectional area is provided between each sphere and the inner wall of the cylindrical housing, the outer diameter of the sleeve being slightly less than the inner diameter of the cylindrical housing and the inner bore of the sleeve being of considerable cross-sectional area whereby a fluid passage is provided within the interior of the sleeve, an inlet port at the bottom of said cylindrical housing being arranged to be connected to a source of fluid under pressure and an outlet port at the top of said cylindrical housing being arranged to be connected to an outlet pipe provided with an open-shut operating valve.

3. A metering valve including a cylindrical housing having its axis arranged substantially vertically, a three-piece valve within said cylindrical housing comprising two spheres and one sleeve having two end surfaces, a first valve face formed in one end surface of said sleeve and configured to cooperate with one of said spheres and a second valve face formed in the other end surface of said sleeve and configured to cooperate with the other sphere, the sleeve being interposed between the two spheres, the cross-sectional area of the spheres being slightly over one-half of the cross-sectional area of the inner diameter of the cylindrical housing whereby a fluid passage of considerable cross-sectional area is provided between each sphere and the inner wall of the cylindrical housing, the outer diameter of the sleeve being slightly less than the inner diameter of the cylindrical housing and the inner bore of the sleeve being of considerable cross-sectional area whereby a fluid passage is provided within the interior of the sleeve, leakage areas between each of the spheres and the sleeve, an inlet port at the bottom of said cylindrical housing being arranged to be connected to a source of fluid under pressure, and an outlet port at the top of said cylindrical housing being arranged to be connected to an outlet pipe provided with an open-shut operating valve.

4. A metering valve including a cylindrical housing having its axis arranged substantially vertically, a three-piece valve within said cylindrical housing comprising two spheres and one sleeve, the sleeve being interposed between the two spheres, the cross-sectional area of the spheres being substantially less than the cross-sectional area of the inner diameter of the cylindrical housing whereby a fluid passage of considerable cross-sectional area is provided between each sphere and the inner wall of the cylindrical housing, the outer diameter of the sleeve being slightly less than the inner diameter of the cylindrical housing and the inner bore of the sleeve being of considerable cross-sectional area whereby a fluid passage is provided within the interior of the sleeve, a valve seat in the upper end of said cylindrical housing against which the upper sphere is arranged to seat, a valve seat between the upper sphere and the inner bore of the sleeve, a valve seat between the inner bore of the sleeve and the lower sphere and a valve seat in the lower portion of the cylindrical housing against which the lower sphere is adapted to seat, an inlet port at the bottom of said cylindrical housing being arranged to be connected to a source of fluid under pressure, and an outlet port at the top of said cylindrical housing being arranged to be connected to an outlet pipe provided with an open-shut operating valve.

5. A metering valve including a cylindrical housing having its axis arranged substantially vertically, a multi-part valve within said cylindrical housing comprising a plurality of separately moveable elements, the cross-sectional area of at least one of said moveable elements being substantially less than the cross-sectional area of the inner diameter of the cylindrical housing whereby a fluid passage of considerable cross-sectional area is provided between such moveable part and the inner wall of the cylindrical housing, the outer diameter of at least one other moveable part being slightly less than the inner diameter of the cylindrical barrel and said other moveable part being provided with a longitudinally extending bore of considerable cross-sectional area whereby a fluid passage is provided within the interior of such other moveable part, an inlet port at the bottom of said cylindrical housing being arranged to be connected to a source of fluid under pressure, and an outlet port at the top of said cylindrical housing being arranged to be connected to an outlet pipe provided with an open-shut operating valve.

6. A metering valve including a cylindrical housing, an inlet port at one end of said cylindrical housing being arranged to be connected to a source of fluid pressure, an outlet port at the other end of said cylindrical housing being arranged to be connected to an outlet pipe provided with an open-shut operating valve, a three-piece valve within said cylindrical housing, all three pieces being normally urged toward the inlet port of said valve, said three pieces comprising two spheres and one sleeve, the sleeve being interposed between the two spheres, the cross-sectional area of the spheres being slightly over one-half of the cross-sectional area of the inner diameter of the cylindrical housing whereby a fluid passage of considerable cross-sectional area is provided between each sphere and the inner wall of the cylindrical housing, the outer diameter of the sleeve being slightly less than the inner diameter of the cylindrical housing and the inner bore of the sleeve being of considerable cross-sectional area whereby a fluid passage is provided within the interior of the sleeve part.

References Cited in the file of this patent

UNITED STATES PATENTS

| Number | Name | Date |
|---|---|---|
| 1,142,513 | Gase | June 8, 1915 |
| 1,146,114 | Thompson | July 13, 1915 |
| 1,870,188 | Abrams | Aug. 2, 1932 |
| 2,159,656 | Focht | May 23, 1939 |
| 2,331,431 | Simoneau | Oct. 12, 1943 |
| 2,610,859 | Wilcox et al. | Sept. 16, 1952 |